United States Patent [19]

Hall, Sr.

[11] 3,770,907

[45] Nov. 6, 1973

[54] MAGNETIC DISC RECORDER WITH TRANSDUCER ACCESSING MECHANISM UTILIZING A COUNTERWEIGHTED ARM

[75] Inventor: Robert P. Hall, Sr., Auburn, Calif.

[73] Assignee: Arvin Industries, Inc., Columbus, Ind.

[22] Filed: June 27, 1972

[21] Appl. No.: 266,612

[52] U.S. Cl. . 179/100.2 CA, 274/4 H, 340/174.1 C

[51] Int. Cl. ........................ G11b 5/56, G11b 25/04

[58] Field of Search ............ 179/100.2 Z, 100.2 CA, 179/100.2 P; 340/174.1 C, 174.1 F, 174.1 E; 274/4 H, 4 R, 11 A; 206/62 P

[56] References Cited

UNITED STATES PATENTS

| | | | |
|---|---|---|---|
| 3,633,186 | 1/1972 | Lynott | 340/174.1 C |
| 3,484,760 | 12/1969 | Perkins et al. | 340/174.1 C |
| 3,202,974 | 8/1965 | Baillif | 340/174.1 F |
| 3,153,241 | 10/1964 | Ramrath et al. | 179/100.2 CA |
| 3,635,608 | 1/1972 | Crouch et al. | 179/100.2 Z |
| 3,416,150 | 12/1968 | Lindberg, Jr. | 340/174.1 C |
| 3,631,419 | 12/1971 | Ho | 340/174.1 F |
| 3,593,327 | 7/1971 | Shill | 340/174.1 C |
| 3,432,169 | 3/1969 | Schroder | 179/100.2 Z |

*Primary Examiner*—Vincent P. Canney
*Assistant Examiner*—Alfred H. Eddleman
*Attorney*—Lawrence B. Biebel et al.

[57] ABSTRACT

A magnetic disc recorder has a rotatable flexible record disc, a transducer interfacing with the disc and carried on a slide movable toward and away from the disc surface. The slide moves on a block which is movable to carry the transducer along a radius of the disc. A counterweighted arm acts between the block and slide urging the transducer to interface with the disc and providing an inertial mass which damps unwanted motion of the transducer.

3 Claims, 5 Drawing Figures

MAGNETIC DISC RECORDER WITH TRANSDUCER ACCESSING MECHANISM UTILIZING A COUNTERWEIGHTED ARM

CROSS REFERENCE TO RELATED APPLICATION

This application is related to copending application Ser. No. 266,582, filed June 27, 1972, now abandoned in view of a continuation-in-part application Ser. No. 305,335, filed Nov. 10, 1972, entitled MAGNETIC DISC RECORDER AND MAGNETIC DISC CASSETTE, which is assigned to the same assignee as this application.

BACKGROUND OF THE INVENTION

In magnetic disc recording systems, particularly those embodying a disc record, can generally be divided into two catagories, the first being those systems which employ the rigid disc with a hard coated surface, and the second being those which employ a disc of thin flexible material, such as a disc manufactured from wide magnetic recording tape. In the hard surface disc, the head carrying one or more transducers is mounted in such a way that it comes into close proximity with the disc, but avoids actual contact with it, since such contact might destroy the rather brittle magnetic oxide coating on the disc which would in turn destroy the usefulness of the disc. In the flexible disc system, various suggestions have been made to promote head to tape contact without scratching or otherwise damaging the magnetic recording surface. For example, it has been suggested to blow a stream of air at the reverse side of the disc, in the region where the transducer contacts it, or to fasten the flexible disc on the hollow turntable, with the face being pressurized to expand the surface slightly in contact with the head and the transducer therein.

The present invention is concerned with the catagory of flexible magnetic disc recorders, and particularly with a simplification of the head to tape contact system which enables the magnetic record disc to be manufactured inexpensively, for example, in cassette form, and to assure that the head and the transducer or transducers therein are properly contacting the disc during operation for maximum coupling of the magnetic flux.

SUMMARY OF THE INVENTION

In accordance with the invention, the head carrying one or more transducers is mounted to contact a flexible magnetic record disc which is located about a predetermined axis, and which may conveniently be provided in a suitable cassette which surrounds the disc and includes an elongated access opening through which the head and transducer can project to contact the recording surface. The transducer is mounted for movement toward and away from the disc, and it is urged into contact with the disc by a counterweight and an appropriate lever system, the counterweight functioning as an inertial mass which urges the head and transducer into contact with the recording tape and also acts as an inertial damper which will not respond to a particular vibration which might occur in the operation of the disc, but which will allow compliant movement of the head to avoid damaging the recording surface and to allow for some tolerance in the manufacture and operation of the various components of the system.

The movable transducer and head together with the inertial mass are mounted for positioning in any one of a plurality of locations, such that the head can follow any selected one of a number of different circular paths on the recording disc surface. It is also possible, of course, to have the head follow in a helical path, although it has been found in practice that many applications are best suited to the circular track configuration. The head and transducer, together with the counterweight mechanism, is mounted on one or more rods which extend parallel to a radius of the record disc, and a lead screw is provided together with an appropriate stepping motor which drives the lead screw, to advance and retract the head along the radius of the disc, according to the track which it is desired for the head to follow.

It is therefore a primary object of the invention to provide a novel counterweighted movable transducer-head arrangement for magnetic recording discs, whereby the transducer is at all times urged into compliant interface with the disc recording surface, under such circumstances that it can yield to avoid damage to the head or disc; to provide such a system in which the counterweight functions as an inertial mass which damp vibrations which may otherwise be transmitted to the head and transducer, or even induce resonant vibration, and interfere with the proper continuous operation of the recording system; to provide such a mounting arrangement for the transducer and the magnetic disc recorder which is simple to manufacture, install, and operate, and which allows manufacturing tolerances to the parts which are normal for mass production of the system.

Other objects and advantages of the invention will be apparent from the following description, the accompanying drawings and the appended claims.

DESCRIPTION OF THE PREFERRED EMBODIMENT

Figure 1:
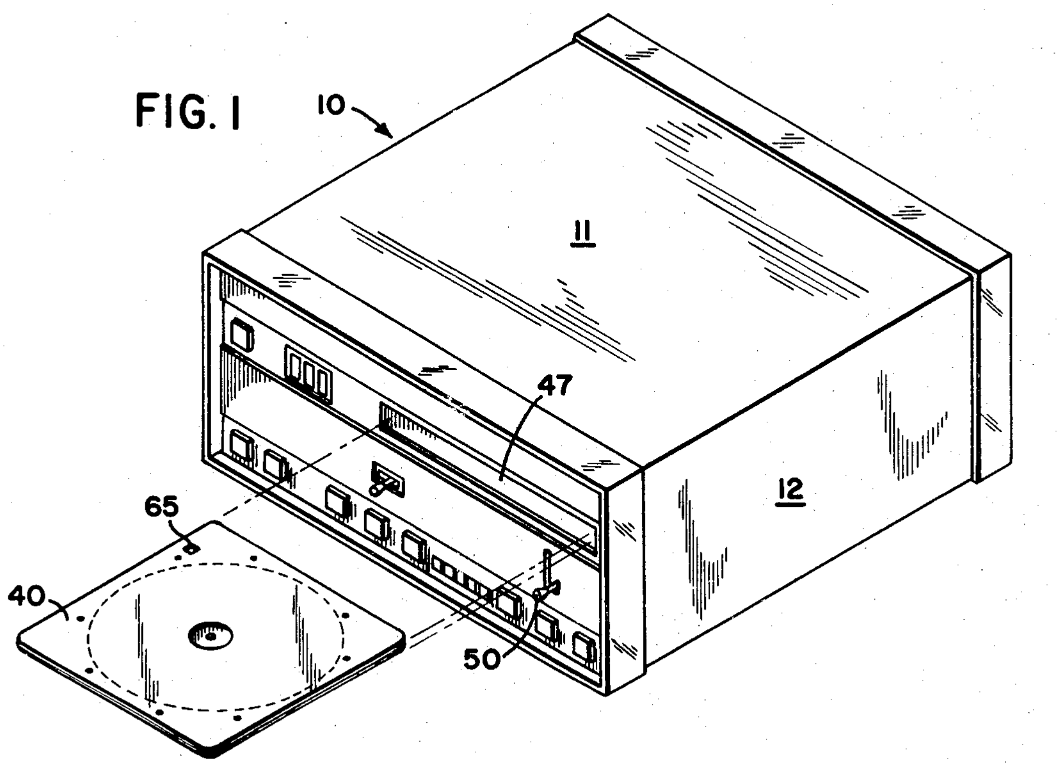
FIG. 1 is a perspective view of a magnetic recording system embodying the invention, showing a cassette which contains a recording media in position to be loaded into the housing of the device.
Figure 2:
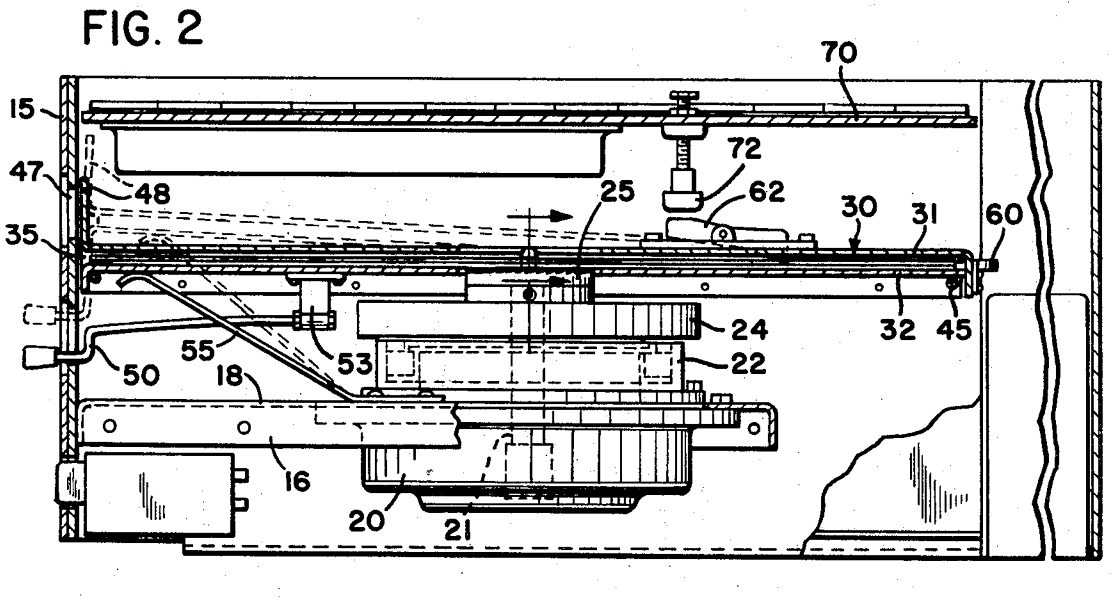
FIG. 2 is a cross-sectional view taken generally through the center of the housing, with some parts broken away or omitted for purposes of clarity.
Figure 3:
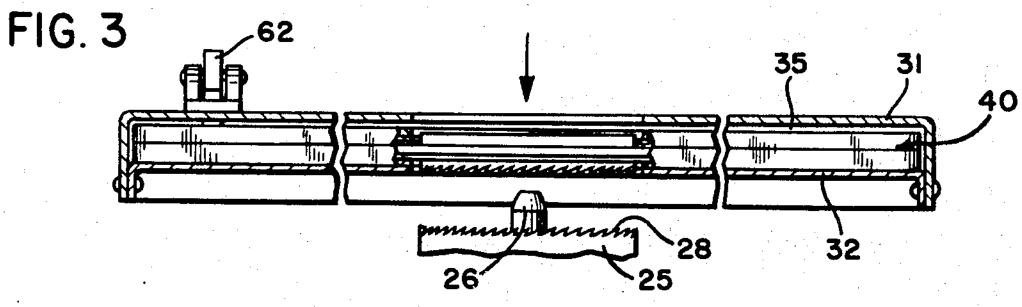
FIG. 3 is a cross-sectional view of the cassette carriage and related portions of the drive, taken on line 3—3 in FIG. 2.

Referring to the drawings, and particularly to FIGS. 1 and 2, the recording system provided by the invention is contained within a housing 10 having a top 11, sides 12, a rear panel 14 and a front panel or face 15. Within this structure there is fastened an inner mounting bracket 16 which is generally U-shaped in configuration, with its base portion resting behind the front panel 15, one of its sides adjacent to one side panel 12, and the other of its sides extending front to back of the housing between the sides forming a partial partition. A base panel 18 is secured to all three sides of the bracket 16 and is supported within the housing elevated somewhat above its bottom.

The base panel 18 provides support for a drive motor 20 having an output shaft 21 which extends vertically, its axis of rotation being generally parallel to the front and rear of the housing. Attached to the motor shaft 21 is a tachometer 22 which forms part of a control loop to regulate the motor output speed. Above the tachometer, also fastened to shaft 21, there is a flywheel 24, and immediately above it is the output or drive hub 25. The end of shaft 21, in the particular construction shown, extends somewhat through the drive hub and provides a locating means 26 which functions to align the drive hub with elements to be driven. The top or upper face of drive hub 25 has a plurality of radially extending undercut teeth 28 which face coaxially of the shaft 21 arranged in a circle around the face of drive hub 25. These teeth rotate in a fixed plane when motor 20 is running, and the elements of the recording cassette are brought into contact with the drive hub.

Immediately above the motor and its drive hub there is a cassette receiving carriage 30 which comprises top and bottom walls 31 and 32 secured together to define a thin elongated chamber 35 into which a thin rectangular cassette 40 may be inserted. Details of the cassette are not essential for purposes of the present explanation, and it should merely be noted that the cassette includes an exposed rotatable driven hub, also having undercut teeth, the driven hub constructed as a complement to the driving hub 25 so that the two hubs may readily engage for the purpose of moving a recording media within the cassette 40. In one successful embodiment, the cassette 40 is constructed as a hollow essentially rigid member of about 10 inches square, having a thickness of less than one-fourth inch.

The carriage 30 is supported at its rear by a pivot or hinge rod 45 which extends through suitable bushings 46 in the sides of the support bracket 16. This supports the carriage for pivotal movement between a playing position which is shown in full lines in FIG. 2, and a loading or unloading position shown in dash lines, where the cassette receiving chamber 35 is generally aligned with a loading opening 47 in the front panel 15. In the playing position an upward extension 48 of the carriage top wall 31 provides a cover for the opening 47. A control handle 50 extends through a slot 51 in front panel 52 and is fastened to a small bracket 53 on the bottom wall 32 of the carriage. Leaf spring 55, which is fixed to the base panel 18, presses against the underside of carriage 30, urging it toward the loading position. The slot 51 includes a lateral extension into which a portion of the handle 50 can engage, locking the carriage in the playing position.

A retaining mechanism functions to locate the cassette in the chamber 35 against the force of an ejector spring 60 (FIG. 4) which is secured to the rear of carriage 30 and includes a portion 61 projecting into the rear of the chamber 35 to engage and press against an edge of the cassette 40. The retainer mechanism includes a latch 62 (FIG. 2) having a corner 64 (FIG. 4) which is normally urged through an opening in the upper wall 31 of the carriage to engage within a notch 65 formed in the cassettes 40. The latch member 62 is pivotally mounted on the top wall 31 of the carriage and urged into the retaining position shown in FIG. 2. An upper panel 70, supported beneath the top 11 of the housing, has a depending stop 72 aligned with the latch member 62 such that when the carriage is raised to the loading position, the latch member 62 will engage stop 72 and move the end 64 out of the notch in the cassette, permitting the ejector spring 60 to eject the cassette partially through the loading opening 47 as the open front end of the carriage comes into alignment with the loading opening. To reverse the procedure for loading, it is necessary only to hold the cassette in the chamber 35 as the carriage begins to be lowered, and the retainer mechanism will engage the notch 65 as the carriage leaves the loading position.

Figures 4, 5:
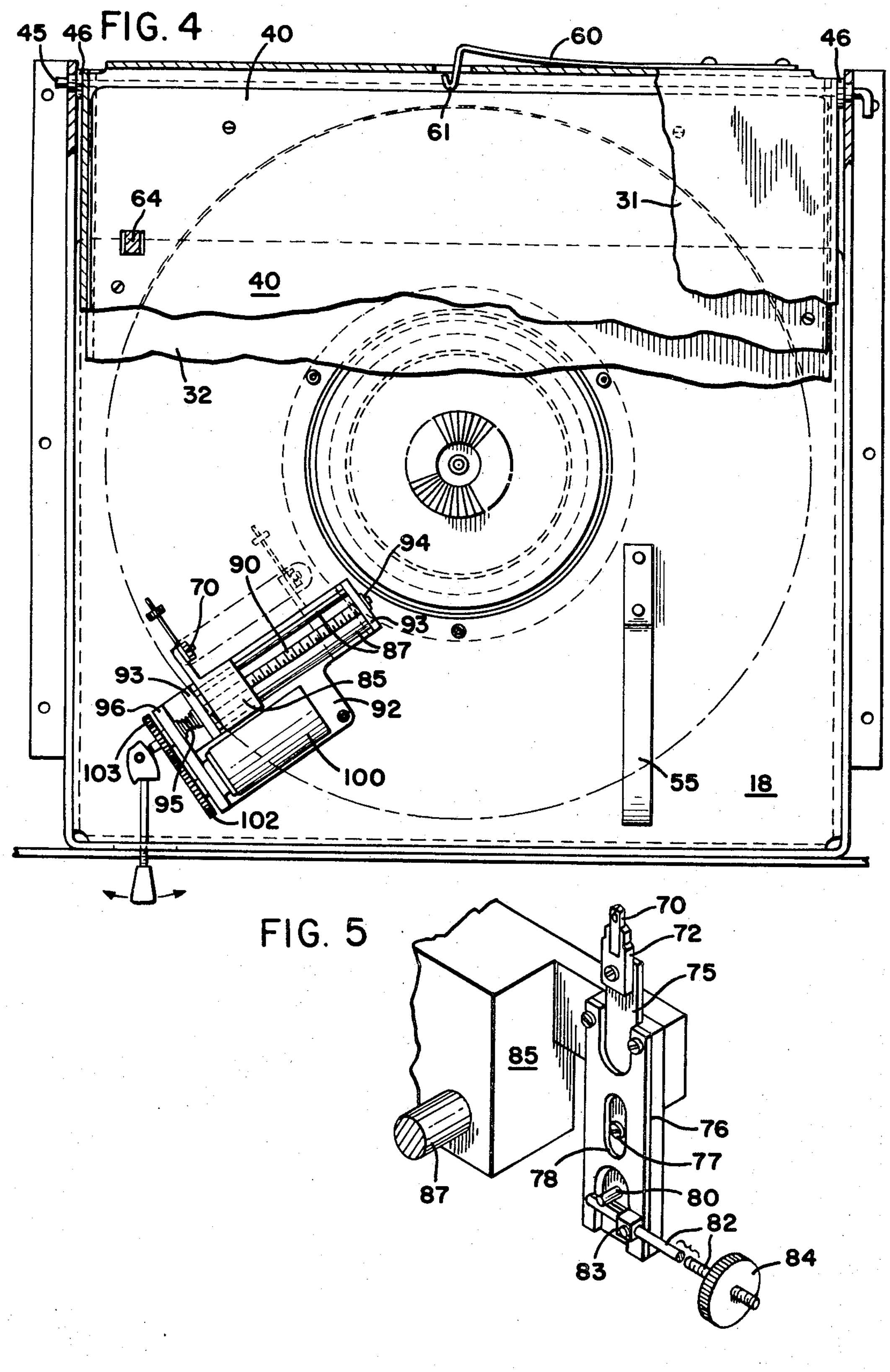
FIG. 4 is a plan view of the central portion of the carriage and drive mechanism, with portions of the carriage and of the cassette broken away to show the face of the drive hub and the general arrangement of the transducer mounting and controls.
FIG. 5 is a perspective view of the transducer mounting and the counterbalanced support therefor.

Referring to FIGS. 4 and 5, a transducer 70, preferably in the form of a single magnetic recording/playback head having a very narrow width (in the order of 0.0009 to 0.010 inch) and a small gap width in the order of 40 microinches, is mounted for cooperation with the recording media within the cassette 40 when the carriage supports the cassette in the playing position as shown particularly in FIG. 6. The transducer 70 is suitably fixed within a supporting block 72 which is arranged for interchangeable mounting on a supporting slide 75 that is strictly vertically movable within a support and guide 76, and limited in its vertical movement by pin 77 which protrudes from the slide 75 through a slot 78 in the support 76.

A further pin 80 extends from a lower portion of slide 75 through an aperture in the support, and in position to engage one end of a control arm 82. This arm is pivotally mounted to the support 76 through a hinge block 83, and an inertial mass in the form of a counterweight 84 is threaded into the outer end of the arm 82. Adjustment of the counterweight toward and away from the hinge block 83 determines the force with which the transducer 70 is urged upward to interface with the recording media in the cassette.

The entire transducer holding mechanism is supported for movement in a direction radially of the cassette by means of a main supporting block 85 to which the support 76 is fastened. This block contains a suitable hole which receives a guide rod 87 that supports the block 85 for precise sliding movement. A lead screw 90 is threaded to a nut (not shown) fixed within the block 85, such that rotation of the lead screw produces a translational movement of the block 85 radially of the carriage 30 (and a cassette therein) as shown generally in FIG. 4. The transducer and its supporting mechanism is shown in full lines in the outermost position and in dash lines in the intermost position, indicating generally the range of movement of the transducer.

The rods 87 and lead screw 90 are supported parallel to each other on a bracket 92 which includes a pair of upstanding ears 93 to which opposite ends of the rods 87 are secured. The lead screw 90 is mounted within bushings 94 within these ears, and extends through a further bushing 95 at the outermost end of the bracket, that bushing being supported within a further upstanding ear 96.

A stepping motor 100 is supported on the bracket to one side of the rods and block 85, as shown in FIG. 4, and is connected to rotate the lead screw through a pair of meshing gears 102 and 103, the former of which is fixed to the output shaft of the stepping motor, while the gear 103 is fixed to the end of the lead screw 90.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a magnetic recorder having a rotatable flexible record disc arranged to rotate in a plane and a transducer mounted to interface with a small portion of the disc surface as it revolves; the improvement comprising compliant mounting means supporting said transducer for movement toward and away from the plane of rotation of said disc, and an inertial mass connected to said mounting means and acting thereon in a direction urging said transducer into interfacing relation with said disc.

2. A magnetic recorder as defined in claim 1, said mounting means including a block movable parallel to a radius of said disc, a slide on said block movable toward and away from said disc, said transducer being supported on said slide, an arm pivoted to said block and acting to move said slide, and a counterweight providing the inertial mass and connected to move said arm in a direction urging said slide toward said disc.

3. In a magnetic recorder having a rotatable flexible record disc and a transducer mounted to interface with a small portion of the disc surface as it revolves; the improvement comprising mounting means including a block movable parallel to a radius of said disc, support means on said block movable toward and away from said disc, said transducer being carried by said support means, an arm connected to said support means and acting to move said support means relative to said block, a counterweight on said arm acting to move said arm in a direction urging said transducer toward said disc, and means for moving said block relative to said disc.

* * * * *